(12) United States Patent
Strasman et al.

(10) Patent No.: US 10,250,889 B1
(45) Date of Patent: Apr. 2, 2019

(54) SYSTEM, METHOD AND COMPUTER READABLE MEDIUM FOR PROVIDING VISUAL CONTENT TO A USER

(75) Inventors: Nery Strasman, Ramat Gan (IL); Ran Oz, Modi'in (IL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 11/860,638

(22) Filed: Sep. 25, 2007

(51) Int. Cl.
*H04N 19/139* (2014.01)
*H04N 19/176* (2014.01)

(52) U.S. Cl.
CPC ......... *H04N 19/176* (2014.11); *H04N 19/139* (2014.11)

(58) Field of Classification Search
None
See application file for complete search history.

(56) References Cited

U.S. PATENT DOCUMENTS

| | | | | |
|---|---|---|---|---|
| 5,754,233 A * | 5/1998 | Takashima | ............. | H04N 19/87 348/390.1 |
| 5,933,567 A * | 8/1999 | Lane | ................. | G11B 15/1875 348/E5.007 |
| 6,741,250 B1 * | 5/2004 | Furlan | ................... | G06T 19/003 345/427 |
| 2003/0007663 A1 * | 1/2003 | Wixson | .............. | H04N 7/17318 382/100 |
| 2004/0179597 A1 * | 9/2004 | Rault | ................... | H04N 19/176 375/240.08 |
| 2005/0028221 A1 * | 2/2005 | Liu | ........................ | H04N 7/147 725/133 |
| 2007/0005804 A1 * | 1/2007 | Rideout | ........................ | 709/246 |
| 2008/0144711 A1 * | 6/2008 | Chui | .................... | H04N 19/159 375/240.01 |
| 2008/0293387 A1 * | 11/2008 | Conn | ................ | G06F 17/30817 455/414.1 |

\* cited by examiner

*Primary Examiner* — Nicholas Sloms
(74) *Attorney, Agent, or Firm* — Lori Anne D. Swanson

(57) ABSTRACT

A system for providing visual content to a user, the system includes: a memory unit for storing information representative of a large image; an input for receiving a request to view a first portion of the large image; an encoder for processing the large image in order to generate macro-blocks and for generating an MPEG compliant video stream representative of the first portion of the large image; wherein the generating includes processing the macro-blocks that form the first portion; and a transmitter for transmitting over a cable network to the user the MPEG compliant video stream.

20 Claims, 3 Drawing Sheets

SYSTEM, METHOD AND COMPUTER READABLE MEDIUM FOR PROVIDING VISUAL CONTENT TO A USER

FIELD OF THE INVENTION

The invention relates to methods, systems and computer readable medium for providing visual content to a user.

BACKGROUND OF THE INVENTION

MPEG Compliant Streams

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. In general, MPEG is used today for transmitting video over terrestrial, wireless, satellite and cable communication channels and also for storing digital video.

A video stream is usually organized as an ordered sequence of pictures. Each picture includes a plurality of slices, each slice including a plurality of macro-blocks. Macroblock can include a macro-block header and information representative of a group of pixels. The group can include an array of 16×16 pixels but this is not necessarily so. The micro-block header includes various fields such as an address of the macro-block in an image, a macro-block type (macro-block belongs to a I-picture, P-picture or B-picture), quantization scale value (usually included if the quantization scale value differs from the quantization scale value of a previous macro-block) and Coded Block Pattern field.

Audio and video streams are provided to an audio encoder and video encoder respectively to generate compressed audio and video elementary streams, also referred to as elementary streams.

A video elementary stream includes a video elementary stream payload. This payload may include pictures. Each picture includes slices and each slice includes macro-blocks. A slice includes a slice header that in turn includes slice type, buffer parameters and encoding parameters.

Elementary streams are packetized to produce PES packets. PES packets made up of elementary streams that form a program share a common time base. The PES packets may also include additional information. PES packets of distinct elementary streams can be arranged as a Transport Stream.

A Transport Stream combines one or more programs with one or more independent time bases into a single stream. Transport Streams include Transport packets of 188 bytes. Transport Stream packets start with a Transport packet header. The header includes a packet identifier (PID). Transport Stream packets of one PID value carry data of a single elementary stream. The packet identifiers are used by user devices to filter selected streams (relating, for example, to a certain television channel to which the user wishes to be tuned to) out of the Transport Stream.

Image Navigation

Due to bandwidth constraints, processing constraints (usually of user computers) and, additionally or alternatively, memory limitations, users can receive a limited amount of information via a network such as a cable network. Users would like to navigate between portions of a large image, without downloading the whole large image to their computer.

There is a need to provide an efficient method and system for providing visual content to a user.

SUMMARY OF THE INVENTION

A system for providing visual content to a user, the system includes: a memory unit for storing information representative of a large image; an input for receiving a request to view a first portion of the large image; an encoder for processing the large image in order to generate macro-blocks and for generating an MPEG compliant video stream representative of the first portion of the large image; wherein the generating includes processing the macro-blocks that form the first portion; and a transmitter for transmitting over a cable network to the user the MPEG compliant video stream.

A computer readable medium having computer-readable code embodied therein for providing visual content to a user, the computer-readable code includes instructions for: receiving information representative of a large image; processing the large image in order to generate macro-blocks; receiving a request to view a first portion of the large image; generating an MPEG compliant video stream representative of the first portion of the large image; wherein the generating includes processing the macro-blocks that form the first portion; and transmitting to the user over a cable network the MPEG compliant video stream.

A method for providing visual content to a user, the method includes: receiving information representative of a large image; processing the large image in order to generate macro-blocks; receiving a request to view a first portion of the large image; generating an MPEG compliant video stream representative of the first portion of the large image; wherein the generating includes processing the macro-blocks that form the first portion; and transmitting to the user over a cable network the MPEG compliant video stream.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

A large image is pre-processed to provide information representative of the large image. When a user requests to view a portion of the large image a video stream representative of that portion is sent to the user. If the user requests to browse the large image video streams representative of various portions of the large image (and of a transition from one portion to the other) are generated in real time, based upon the information representative of the large image. Conveniently, there is no need to perform complex encoding in real time, thus simplifying the stream creation process.

According to an embodiment of the invention a single large image is processed to provide information representative of the large image at different resolution. This can facilitate zoom in and zoom out requests, without performing complex real time processing.

Figure 1:
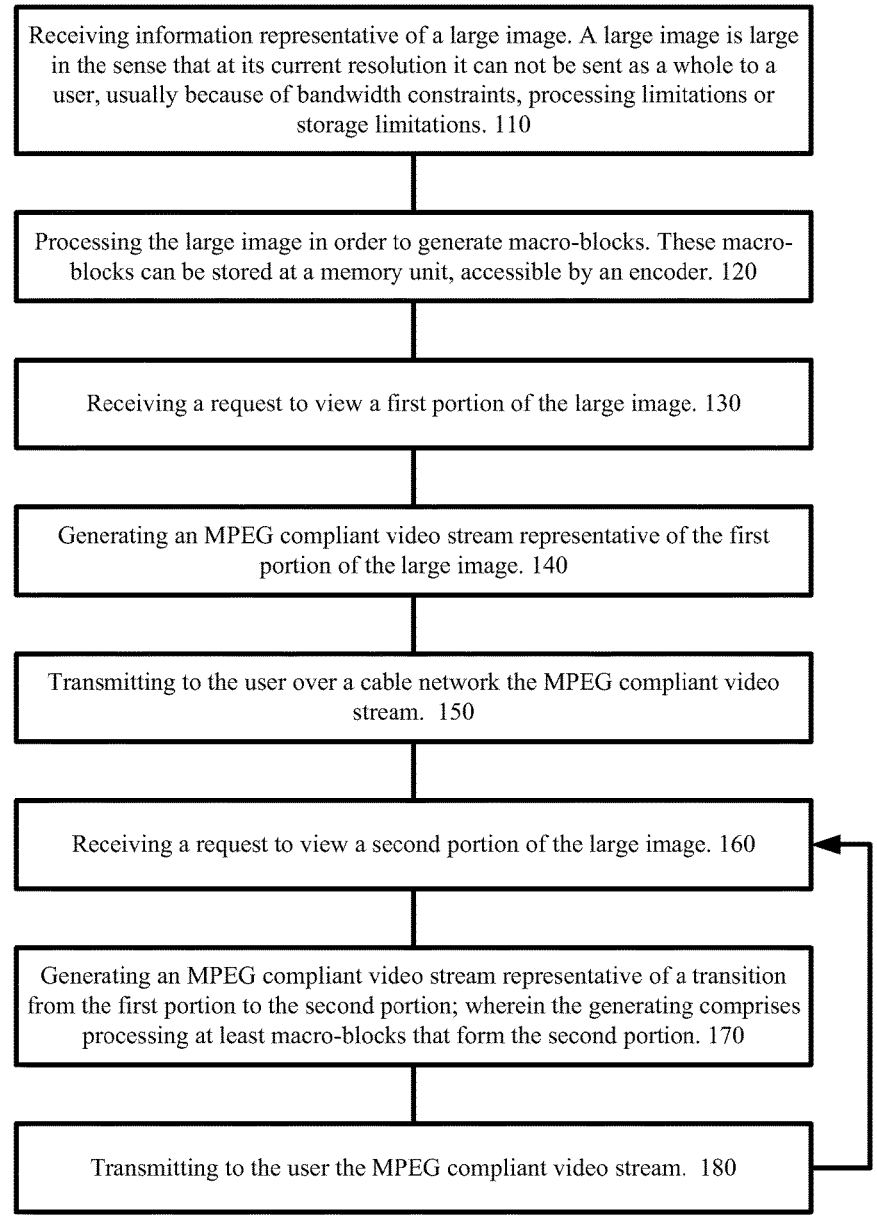
FIG. 1 illustrates a method for providing visual content to a user.

FIG. 1 illustrates method 100 for providing visual content to a user, according to an embodiment of the invention.

Method 100 starts by a pair of preliminary stages—stage 110 and 120. During these preliminary stage information representative of a large image is received and is processed. Preliminary stages 110 and 120 can be executed once per large image, while other stages of method 100 can be generated per request of a user to view a portion of that image.

Stage 110 includes receiving information representative of a large image. A large image is large in the sense that at its current resolution it can not be sent as a whole to a user, usually because of bandwidth constraints, presentation limitations, processing limitations or storage limitations.

Stage 110 is followed by stage 120 of processing the large image in order to generate macro-blocks. These macro-blocks can be stored at a memory unit, accessible by an encoder. The macro-blocks are stored in a compressed format. For example the macro-blocks can be stored in an intra-encoded format—in the format they would appear in an I picture.

It is noted that multiple large images can be stored at a repository. In order to make these large images available to users, each large image should be processed by stage 110 and 120.

Stage 120 is followed by stage 130 of receiving a request to view a first portion of the large image. The request can be generated by a user that utilizes a graphic man machine interface, by providing coordinates of the first portion, by using image navigation tools and the like.

Stage 130 is followed by stage 140 of generating an MPEG compliant video stream representative of the first portion of the large image. Stage 140 includes processing the macro-blocks that form the first portion.

Stage 140 conveniently includes generating I-pictures by selectively altering macro-block headers, generating slices, images and image sequences.

Conveniently, the MPEG compliant video stream includes one or more picture sequences. A picture sequence can start by an I-picture and be followed by dependently decodable pictures (B-pictures, P-pictures). These dependently decodable pictures can be MPEG compliant duplicating pictures that merely indicate that a content of a certain picture should be duplicated. The value of the motion vector of such pictures is zero. The MPEG compliant video stream, once received and decoded by a user device, will cause a user display to present the first portion.

Stage 140 is followed by stage 150 of transmitting to the user over a cable network the MPEG compliant video stream.

If the user merely wishes to view the first portion method 100 can end. Nevertheless, in many cases the user wishes to browse (or navigate) the large image and receive one portion of the image after the other.

Once the user wishes to receive another portion of the image the method generates an MPEG compliant video stream that represents the transition from one portion to the other portion. The generation of this MPEG compliant video stream can be subjected to various timing constraints or quality constraints. For example, the transition can be limited by time in order to provide the user an almost real time transition between the previous and current portions of the image. Yet for another example, the transition can be allowed to generate a certain amount of visual artifacts.

Stage 150 is followed by stage 160 of receiving a request to view a second portion of the large image.

Stage 160 is followed by stage 170 of generating an MPEG compliant video stream representative of a transition from the first portion to the second portion; wherein the generating comprises processing at least macro-blocks that form the second portion.

Conveniently, stage 160 can include processing at least some of the macro-blocks that formed the first portion in response to an overlap between the first and second portions. Accordingly, the generating of the second portion can be at least partially based upon macro-blocks that belonged to the first portion, especially if these macro-blocks belong to both the first and second portions.

Conveniently, stage 160 includes generating an MPEG compliant video stream that includes a sequence of I-pictures, wherein an overlap between consecutive I-pictures of the sequence is responsive to: (i) a distance between the first portion and the second portion, (ii) generation rate of the MPEG compliant video stream, and (iii) a timing constraint imposed on a display of the transition from the first portion to the second portion.

For example, assuming that: (i) the timing constraints virtually limit the number of I-pictures that can be transmitted during the transmission to four I-pictures (not including the last I-picture that is representative of the first portion), (ii) the second portion is eighty pixels above the first portion and one hundred and sixty pixels to the left of the first portion, and (iii) the I-pictures that are transmitted during the transmission represent image portions that are evenly spaced from each other. Under these assumption, each I-picture represents an image portion that is one macro-block above and two macro-blocks to the left of a previous macro-block.

It is noted that I-pictures that are transmitted during the transmission represent image portions that are not evenly spaced from each other.

It is noted that one portion can differ from another by its resolution. Thus, macro-blocks from different representations of the large image should be used.

Conveniently, stage 160 includes generating an MPEG compliant video stream that includes sequences of B-pictures between I-pictures.

Stage 170 is followed by stage 180 of transmitting the MPEG compliant video stream over a bandwidth limited channel.

Those of skill in the art will appreciate that stages 150-170 can be repeated for each portion of the large image that is not currently displayed to the user. Accordingly, the terms "first" portion and "second" portions are used in order to differentiate between currently displayed portion and the next portion to be displayed.

Figure 2:
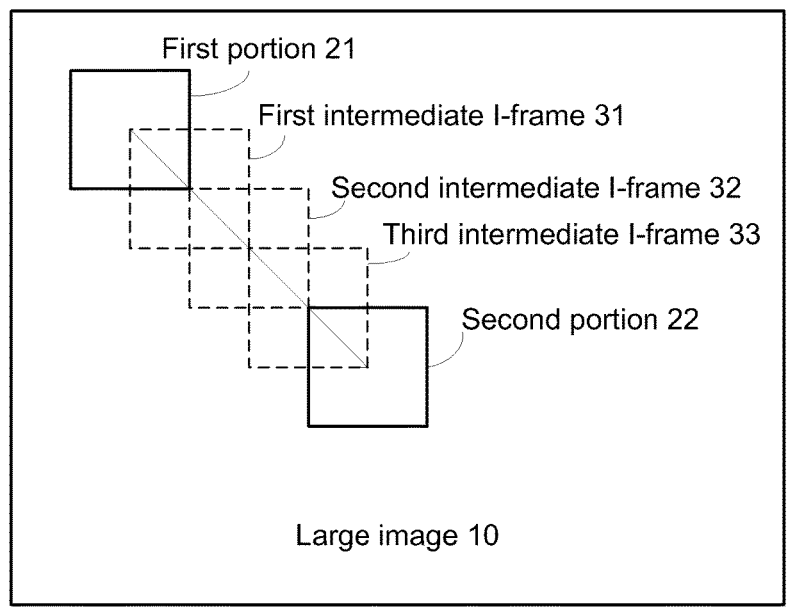
FIG. 2 illustrates a large image, a first and second portions of the large image and three intermediate I pictures transmitted during a transition between the first and second portions of the large image, according to an embodiment of the invention.
Figure 3:
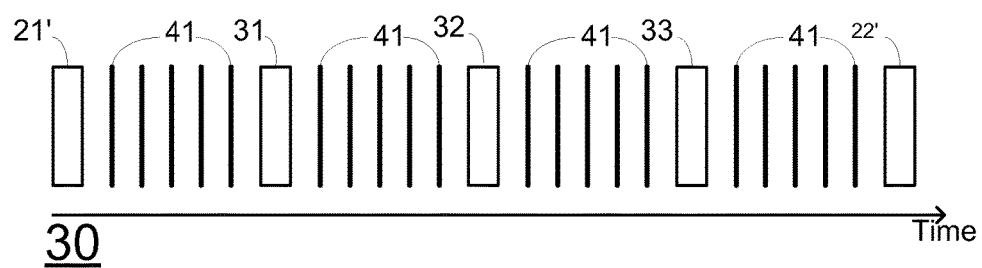
FIG. 3 is a timing diagram of a transition between a first and a second portion of the large image of FIG. 2, according to an embodiment of the invention.

FIG. 2 illustrates large image 10, first portion 21, second portions 22 of large image 10 and three intermediate I pictures 31-33 transmitted during a transition between the first and second portions 21 and 22 of large image 10, according to an embodiment of the invention. FIG. 3 is a timing diagram 30 that illustrates a transmission of I pictures and duplicating pictures that form a MPEG compliant video stream of the transition.

It is assumed that the user requested to view first portion 21 and then view the second portion 22 of large image 10.

Before the transition the user received an MPEG compliant video stream that include an I picture 21' that represents first portion 21 and duplicating pictures. Accordingly, although the user device received an MPEG compliant video stream the user saw a virtually "still" image of first portion 21.

After a request to view second portion 22 a MPEG compliant video stream is generated and transmitted to the user. The MPEG compliant video stream includes the following sequence of pictures: (i) I-picture 21' representative of first portion 21, (ii) B-pictures and/or P-pictures (collectively denoted 41) that represent a transition from first portion 21 to first intermediate I-picture 31, (iii) B-pictures and/or P-pictures (collectively denoted 41) that represent a transition from first intermediate I-picture 31 to second intermediate I-picture 32, (iv) second intermediate I-picture 32, (v) B-pictures and/or P-pictures (collectively denoted 41) that represent a transition from second intermediate I-picture to third intermediate I-picture 33, (vi) third intermediate I-picture 33, (vii) B-pictures and/or P-pictures (collectively denoted 41) that represent a transition from third intermediate I-picture 33 to second portion 22.

Figure 4:
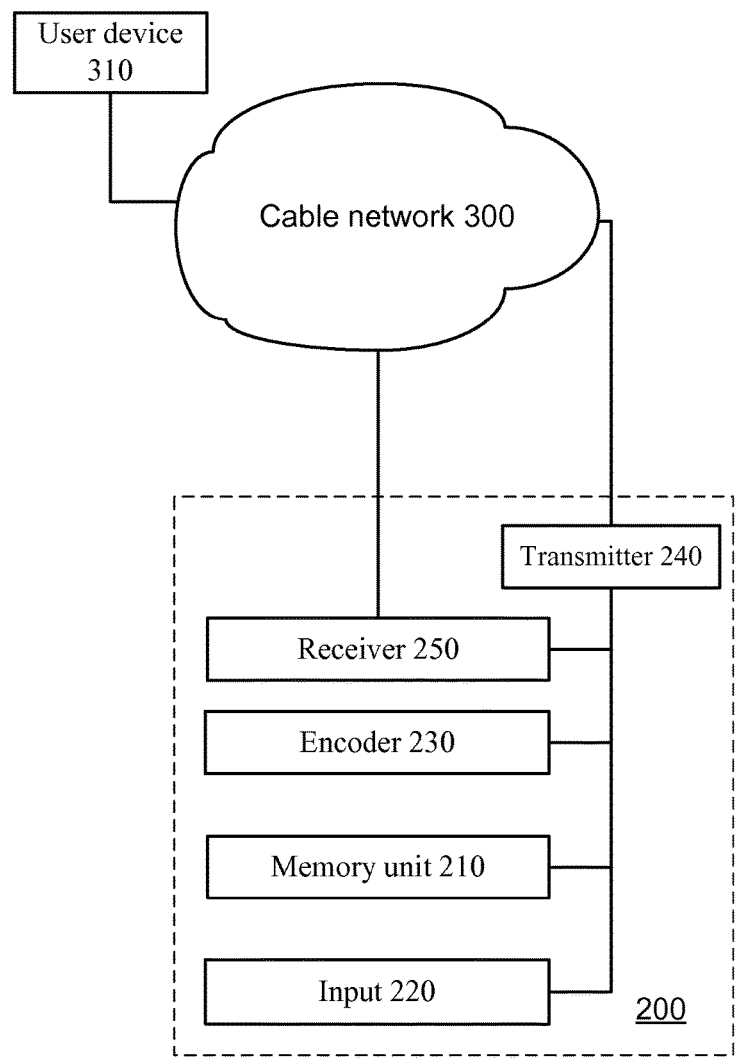
FIG. 4 illustrates a system for providing visual content to a user and its environment, according to an embodiment of the invention.

FIG. 4 illustrates system 200 according to an embodiment of the invention.

System 200 includes: (i) memory unit 210 for storing information representative of a large image; (ii) input 220 for receiving a request to view a first portion of the large image; (iii) encoder 230 for processing the large image in order to generate macro-blocks and for generating an MPEG compliant video stream representative of the first portion of the large image; wherein the generating comprises processing the macro-blocks that form the first portion; and (iv) transmitter 240 for transmitting to the user the MPEG compliant video stream.

System 200 is connected via cable network 300 to one of more user devices 310 such as set top boxes and especially set top boxes that are not capable to browse over the internet. System 200 can be located in a hub, headend, Video On Demand plant, server plant, and the like. It is noted that various components of system 200 can be located in proximate to each other, integrated with each other of spaced apart from each other. System 200 also includes a receiver 250 for receiving user requests to view portions of large images.

Conveniently, encoder 230 is adapted to perform at least one of the following or a combination thereof: (i) Generate an MPEG compliant video stream that comprises duplication pictures and I-pictures that are representative of the first portion; (ii) generate, in response to a request to view a second portion of the large image, an MPEG compliant video stream representative of a transition from the first portion to the second portion wherein the generating comprises processing at least macro-blocks that form the second portion; (iii) Processes at least some of the macro-blocks that formed the first portion in response to an overlap between the first and second portions; (iv) generate an MPEG compliant video stream that includes a sequence of I-pictures, wherein an overlap between consecutive I-pictures of the sequence is responsive to: (a) a distance between the first portion and the second portion, (b) generation rate of the MPEG compliant video stream, and (c) a timing constraint imposed on a display of the transition from the first portion to the second portion, and (v) generate an MPEG compliant video stream that includes sequences of B-pictures between I-pictures. System 200 can executed at least part of the stages of method 100.

The invention can be executed by a computer-readable code that includes instructions to execute one or more stages of method 100. The computer-readable code can be stored in a computer readable medium such as but not limited to a disk, a tape, a diskette, a compact disk, a memory unit and the like.

Conveniently, a computer readable medium having computer-readable code embodied therein for sharing media content is provided. The computer-readable code including instructions for: (i) receiving information representative of a large image; (ii) processing the large image in order to generate macro-blocks; (iii) receiving a request to view a first portion of the large image; and (iv) generating an MPEG compliant video stream representative of the first portion of the large image; wherein the generating comprises processing the macro-blocks that form the first portion; and transmitting to the user over a cable network the MPEG compliant video stream.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing visual content to a user, the method comprising:
   receiving, at a location remote from a receiving display device or decoder, information representative of an image, wherein said image is divisible in to one or more portions each having a size smaller than the image;
   processing the image in order to generate a plurality of macro-blocks;
   compressing individually each of said macro-blocks that correspond to the image based on a plurality of resolutions, and storing each of the plurality of individually compressed macro-blocks that represent the entire image at each of the plurality of resolutions;
   receiving a request for a first portion of the image, the request including coordinates of said first portion;
   responsive to receipt of the request for the first portion of the image, said first portion defined by coordinates that are within coordinates of said image such that the first portion is geometrically smaller than said image and excludes at least a second portion of the image, processing only the compressed macro-blocks from storage that are within said coordinates defining the first portion of the image to generate an encoded MPEG compliant video stream including an I-picture that represents only said first portion and dependently decodable pictures having motion vectors equal to 0 indicating that a content of the I-picture is to be duplicated; and
   transmitting to the user over a cable network the encoded MPEG compliant video stream representing only the first portion of the image for display.

2. The method according to claim 1 comprising processing the information representative of the image to provide information representative of the image at different resolutions and utilizing the information representative of the image at different resolutions to fulfill zoom in or zoom out requests.

3. The method according to claim 1 further comprising:
   receiving a request to view a second portion of the image;

generating an MPEG compliant video stream representative of a transition from the first portion to the second portion; wherein the generating comprises processing at least macro-blocks that form the second portion; and transmitting the MPEG compliant video stream over a bandwidth limited channel.

4. The method according to claim 3 wherein the generating comprises processing at least some of the macro-blocks that formed the first portion in response to an overlap between the first and second portions.

5. The method according to claim 3 comprising generating an MPEG compliant video stream that comprises a sequence of I-pictures, wherein an overlap between consecutive I-pictures of the sequence is responsive to: (i) a distance between the first portion and the second portion, (ii) generation rate of the MPEG compliant video stream, and (iii) a timing constraint imposed on a display of the transition from the first portion to the second portion.

6. The method according to claim 3 comprising generating the MPEG compliant video stream representative of the transition from the first portion to the second portion in response to an allowable amount of visual artifacts.

7. A non-transitory computer readable medium having computer-readable code embodied therein for providing visual content to a user, the computer-readable code comprising instructions for:
receiving information representative of an image, wherein said image is divisible in to one or more portions each having a size smaller than the image;
processing the image in order to generate a plurality of macro-blocks;
compressing individually each of said macro-blocks that correspond to the image based on a plurality of resolutions, and storing each of the plurality of individually compressed macro-blocks that represent the entire image at each of the plurality of resolutions;
receiving a request for a first portion of the image, the request including coordinates of said first portion;
responsive to receipt of the request for the first portion of the image, said first portion defined by coordinates that are within coordinates of said image such that the first portion is geometrically smaller than said image and excludes at least a second portion of the image, processing only the compressed macro-blocks from storage that are within said coordinates defining the first portion of the image to generate an encoded MPEG compliant video stream including an I-picture that represents only said first portion and dependently decodable pictures having motion vectors equal to 0 indicating that a content of the I-picture is to be duplicated; and
transmitting to the user over a cable network the encoded MPEG compliant video stream representing only the first portion of the image for display.

8. The non-transitory computer readable medium of claim 7, wherein the computer-readable code comprises instructions for processing the information representative of the image to provide information representative of the image at different resolutions and utilizing the information representative of the image at different resolutions to fulfill zoom in or zoom out requests.

9. The non-transitory computer readable medium of claim 7, wherein the computer-readable code comprises instructions for storing the macro-blocks in an intra-encoded format.

10. The non-transitory computer readable medium of claim 7, wherein the computer-readable code comprises instructions for:
receiving a request to view a second portion of the image;
generating an MPEG compliant video stream representative of a transition from the first portion to the second portion; wherein the generating comprises processing at least macro-blocks that form the second portion; and
transmitting the MPEG compliant video stream to the user.

11. The non-transitory computer readable medium of claim 10, wherein the computer-readable code comprises instructions for processing at least some of the macro-blocks that formed the first portion in response to an overlap between the first and second portions.

12. The non-transitory computer readable medium of claim 10, wherein the computer-readable code comprises instructions for generating an MPEG compliant video stream that comprises a sequence of I-pictures, wherein an overlap between consecutive I-pictures of the sequence is responsive to: (i) a distance between the first portion and the second portion, (ii) generation rate of the MPEG compliant video stream, and (iii) a timing constraint imposed on a display of the transition from the first portion to the second portion.

13. The non-transitory computer readable medium of claim 11, wherein the computer-readable code comprises instructions for generating the MPEG compliant video stream representative of the transition from the first portion to the second portion in response to an allowable amount of visual artifacts.

14. A system for providing visual content to a user, the system comprising:
a memory unit for storing information representative of a image;
an input for receiving a request for a first portion of the image, the request including coordinates of said first portion, said first portion defined by coordinates that are within coordinates of said image such that the first portion is geometrically smaller in size than the image and excludes at least a second portion of the image;
an encoder for processing the image in order to generate a plurality of macro-blocks, the encoder operable for:
compressing individually each of said macro-blocks that correspond to the image based on a plurality of resolutions for storing each of the plurality of individually compressed macro-blocks that represent the entire image at each of the plurality of resolutions, and
processing only the compressed macro-blocks from storage that are within said coordinates defining the first portion of the single encoded picture to generate an encoded MPEG compliant video stream that includes an I-picture representative of only the first portion of said image and dependently decodable pictures having motion vectors equal to 0 indicating that a content of the I-picture is to be duplicated; and
a transmitter for transmitting over a cable network to the user the encoded MPEG compliant video stream representing only the first portion of the image for display.

15. The system according to claim 14 wherein the encoder processes the information representative of the image to provide information representative of the image at different resolutions and utilizes the information representative of the image at different resolutions to fulfill zoom in or zoom out requests.

16. The system according to claim 14 further adapted to store the macro-blocks in an intra-encoded format.

17. The system according to claim 14 wherein the encoder generates, in response to a request to view a second portion of the image, an MPEG compliant video stream representative of a transition from the first portion to the second portion; wherein the generating comprises processing at least macro-blocks that form the second portion; and the transmitter transmits the MPEG compliant video stream to the user.

18. The system according to claim 17 wherein the encoder processes at least some of the macro-blocks that formed the first portion in response to an overlap between the first and second portions.

19. The system according to claim 17 wherein the encoder generates an MPEG compliant video stream that comprises a sequence of I-pictures, wherein an overlap between consecutive I-pictures of the sequence is responsive to: (i) a distance between the first portion and the second portion, (ii) generation rate of the MPEG compliant video stream, and (iii) a timing constraint imposed on a display of the transition from the first portion to the second portion.

20. The system according to claim 17 wherein the encoder generates the MPEG compliant video stream representative of the transition from the first portion to the second portion in response to an allowable amount of visual artifacts.

\* \* \* \* \*